(12) United States Patent
Tsukamoto

(10) Patent No.: US 12,438,446 B2
(45) Date of Patent: Oct. 7, 2025

(54) POWER SUPPLY DEVICE AND SEMICONDUCTOR DEVICE

(71) Applicant: Kioxia Corporation, Tokyo (JP)

(72) Inventor: Takayuki Tsukamoto, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 239 days.

(21) Appl. No.: 18/450,301

(22) Filed: Aug. 15, 2023

(65) Prior Publication Data

US 2024/0097561 A1    Mar. 21, 2024

(30) Foreign Application Priority Data

Sep. 21, 2022  (JP) ................... 2022-149914

(51) Int. Cl.
   *H02M 1/36*  (2007.01)
   *H02M 1/00*  (2007.01)
   *H02M 3/158*  (2006.01)

(52) U.S. Cl.
   CPC ........... *H02M 1/36* (2013.01); *H02M 1/0032* (2021.05); *H02M 1/0045* (2021.05); *H02M 1/008* (2021.05); *H02M 1/009* (2021.05); *H02M 3/1584* (2013.01)

(58) Field of Classification Search
   CPC .. H02M 1/0032; H02M 1/0045; H02M 1/008; H02M 1/009; H02M 1/36; H02M 3/158
   See application file for complete search history.

(56) References Cited

U.S. PATENT DOCUMENTS

| | | | |
|---|---|---|---|
| 10,298,219 B2 | 5/2019 | Lee et al. | |
| 2003/0202296 A1* | 10/2003 | Hamano | H01H 9/542 361/2 |
| 2018/0348804 A1* | 12/2018 | Satake | G05F 1/56 |
| 2021/0034137 A1 | 2/2021 | Wada | |
| 2021/0193682 A1 | 6/2021 | Maeno | |
| 2021/0311540 A1* | 10/2021 | Wong | G06F 1/3275 |

FOREIGN PATENT DOCUMENTS

| | | |
|---|---|---|
| JP | 2013-058971 A | 3/2013 |
| JP | 5278167 B2 | 9/2013 |
| JP | 2021-027110 A | 2/2021 |
| JP | 2021-101512 A | 7/2021 |

* cited by examiner

*Primary Examiner* — Jue Zhang
(74) *Attorney, Agent, or Firm* — Kim & Stewart LLP

(57) ABSTRACT

A power supply device includes a switching circuit and first and second control circuits. The switching circuit is between a regulator circuit and a terminal and is configured to transition between a first state in which a second power supply voltage is supplied to the terminal and a second state in which supply of the second power supply voltage to the terminal is cut off. The first control circuit is configured to output a reset signal that is set to a first voltage or a second voltage. The second control circuit is configured to be driven by the second power supply voltage and to perform control so that the switching circuit transitions to the first or second state when the reset signal is at the first voltage. The switching circuit is configured to switch to the second state when the reset signal is set to the second voltage.

20 Claims, 11 Drawing Sheets

POWER SUPPLY DEVICE AND SEMICONDUCTOR DEVICE

CROSS-REFERENCE TO RELATED APPLICATION

This application is based upon and claims the benefit of priority from Japanese Patent Application No. 2022-149914, filed Sep. 21, 2022, the entire contents of which are incorporated herein by reference.

FIELD

Embodiments described herein relate generally to a power supply device and a semiconductor device.

BACKGROUND

A semiconductor device includes a digital circuit or an analog circuit such as a logic circuit, and a voltage regulator that generates an internal power supply voltage to be supplied to these circuits. In such a semiconductor device, a power switch (PSW) may be located between the digital circuit or the analog circuit and the voltage regulator. In case of the semiconductor device on standby, the PSW cuts off supply of the internal power supply voltage to some of the circuits provided in the semiconductor device. Accordingly, the semiconductor device may reduce power consumption by reducing unnecessary current consumption such as leakage current during standby. In addition, the semiconductor device also includes a PSW control circuit that switches on the PSW at appropriate timing. The PSW control circuit is driven by an internal power supply voltage generated by a voltage regulator.

At the startup of the semiconductor device, the voltage regulator raises the internal power supply voltage from the ground voltage to the target voltage of the output voltage over time. The internal power supply voltage generated by the voltage regulator is supplied to the PSW control circuit and the like even during startup. In order to properly operate the PSW, it is required to design the semiconductor device so that the internal power supply voltage reliably rises to the normal operating voltage even at startup.

DETAILED DESCRIPTION

Embodiments provide a power supply device and a semiconductor device that can suitably control the supply of power supply voltage to a circuit.

In general, according to one embodiment, a power supply device is provided. The power supply device includes a regulator circuit, a terminal, a switching circuit, a first control circuit, a second control circuit, and reset wiring. The regulator circuit is configured to generate a second power supply voltage based on an input first power supply voltage. The terminal outputs the second power supply voltage. The switching circuit is provided between the regulator circuit and the terminal and is configured to transition between a first state in which the second power supply voltage is supplied to the terminal and a second state in which supply of the second power supply voltage to the terminal is cut off. The first control circuit is configured to output a reset signal that is set to a first voltage or a second voltage different from the first voltage. The second control circuit is configured to be driven by the second power supply voltage and to perform control so that the switching circuit transitions to the first state or the second state when the reset signal is at the first voltage. The reset wiring electrically connects the first control circuit and the switching circuit without passing through the second control circuit. The switching circuit is configured to transition to the second state regardless of the control by the second control circuit when the reset signal received via the reset wiring is set to the second voltage.

Embodiments are to be described in detail below with reference to the accompanying drawings. The scope of the present disclosure is not limited to the embodiments disclosed herein.

First Embodiment

Figure 1:
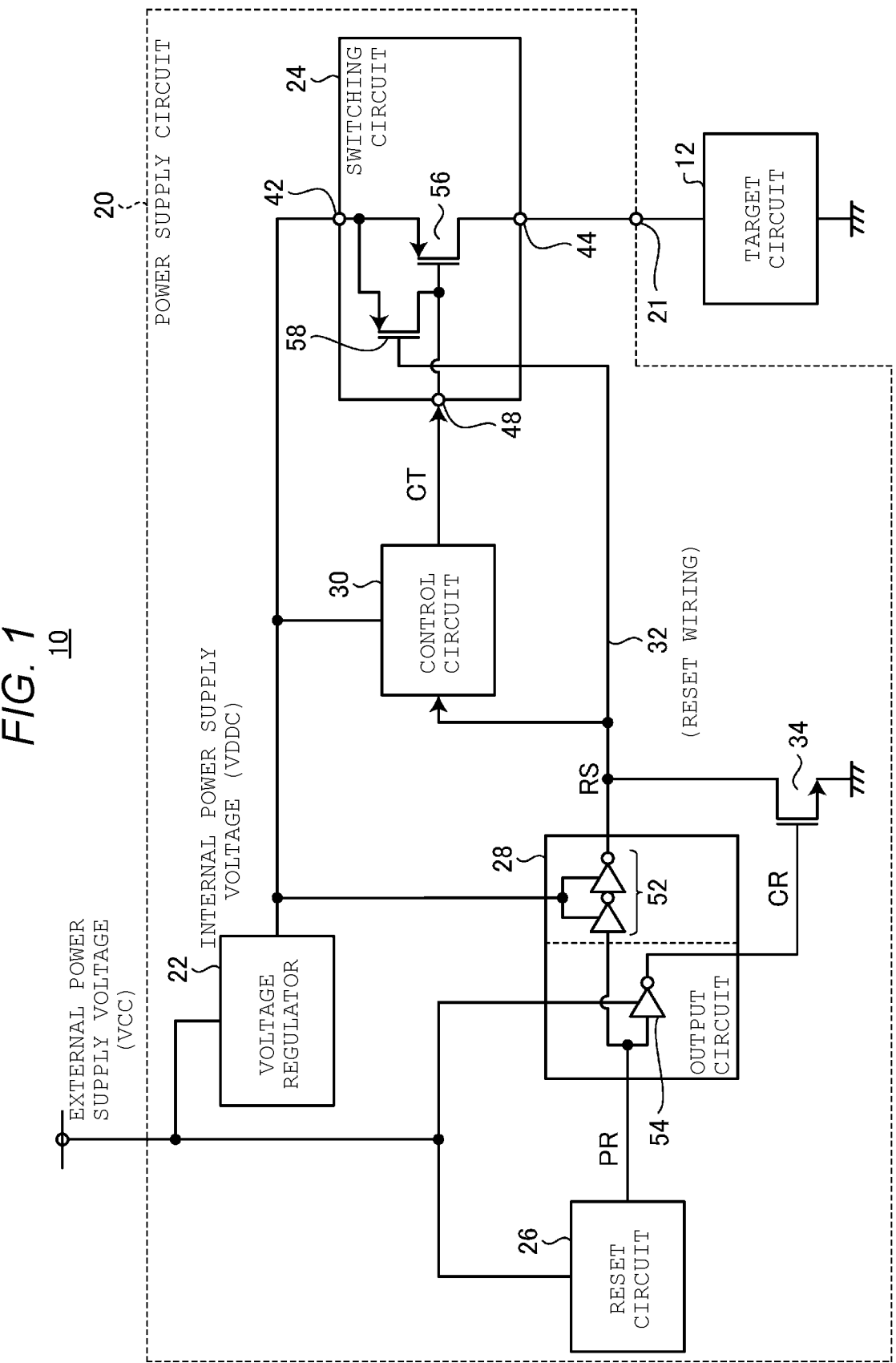
FIG. 1 is a diagram illustrating a configuration of a power supply circuit according to a first embodiment.

FIG. 1 is a diagram illustrating a configuration of a semiconductor device 10 including a power supply circuit 10 according to a first embodiment and a target circuit 12.

An internal power supply voltage VDDC is supplied from the power supply circuit 20 to the target circuit 12 and the target circuit 12 is driven by the internal power supply voltage VDDC. According to the present embodiment, the target circuit 12 is a digital circuit such as a logic circuit or an analog circuit such as a memory circuit. The target circuit 12 may be a circuit in which digital circuits and analog circuits are mixed.

An external power supply voltage VCC is supplied to the power supply circuit 20. The power supply circuit 20 supplies the internal power supply voltage VDDC to the target circuit 12. The power supply circuit 20 is an example of a power supply device. The power supply circuit 20 may be mounted on a chip separate from the target circuit 12. In addition, the power supply circuit 20 may be configured as one chip, may be configured as a plurality of chips, and may be configured as a discrete circuit.

The power supply circuit 20 includes a terminal 21, a voltage regulator 22, a switching circuit 24, a reset circuit 26, an output circuit 28, a control circuit 30, reset wiring 32, and a reset switch 34. The output circuit 28 and the reset switch 34 may be referred to herein as first control circuits. In addition, the control circuit 30 may be referred to herein as a second control circuit.

The terminal 21 is connected to the target circuit 12. The internal power supply voltage VDDC generated by the power supply circuit 20 is supplied to the target circuit 12 via the terminal 21.

The external power supply voltage VCC is supplied to the voltage regulator 22. The voltage regulator 22 generates the internal power supply voltage VDDC to be output to the outside based on the input external power supply voltage VCC. The internal power supply voltage VDDC is supplied to the output circuit 28 and the control circuit 30. The internal power supply voltage VDDC is further supplied to the target circuit 12 via the switching circuit 24. The voltage regulator 22 stabilizes the internal power supply voltage VDDC to a predetermined voltage. The predetermined voltage is a target voltage of a voltage output by the voltage regulator 22. Hereinafter, this voltage is referred to as a normal operating voltage. Accordingly, the target circuit 12 can receive the internal power supply voltage VDDC stabilized to the normal operating voltage, even if the power consumption thereby fluctuates.

The switching circuit 24 is provided between the voltage regulator 22 and the terminal 21. The switching circuit 24 transitions to an on state (also referred to herein as a first state) in which the internal power supply voltage VDDC generated from the voltage regulator 22 is supplied to the terminal 21 or an off state (also referred to herein as a second state) in which supply of the internal power supply voltage VDDC to the terminal 21 is cut off. That is, the on state is an output state of the internal power supply voltage VDDC, and the off state is a cut-off state of the internal power supply voltage VDDC. The first state is a state in which the internal power supply voltage VDDC can be supplied to the target circuit 12 via the terminal 21. The second state is a state in which the internal power supply voltage VDDC cannot be supplied to the target circuit 12 via the terminal 21.

For example, the switching circuit 24 includes a voltage input terminal 42 and a voltage output terminal 44. The voltage input terminal 42 is connected to the voltage regulator 22. The voltage input terminal 42 receives the internal power supply voltage VDDC from the voltage regulator 22. The voltage output terminal 44 is connected to the target circuit 12 via the terminal 21. The voltage output terminal 44 outputs the internal power supply voltage VDDC received from the voltage input terminal 42 to the target circuit 12 via the terminal 21. The switching circuit 24 short-circuits between the voltage input terminal 42 and the voltage output terminal 44 in an on state. The switching circuit 24 cuts off between the voltage input terminal 42 and the voltage output terminal 44 in an off state.

The switching circuit 24 is connected to the control circuit 30. The switching circuit 24 transitions to an on state or an off state according to the control of the control circuit 30. According to the present embodiment, the switching circuit 24 transitions to an on state or an off state according to the voltage of the control signal CT output from the control circuit 30. In addition, the switching circuit 24 is connected to the reset switch 34 via the reset wiring 32. The switching circuit 24 enters a state of transitioning to an on state or an off state by a control signal CT according to a reset signal RS received from the reset wiring 32 or a state of forcedly entering an off state. More specifically, when the reset signal RS is at the first voltage, the switching circuit 24 enters a state of transitioning to an on state or an off state by the control signal CT. In addition, when the reset signal RS is a second voltage different from the first voltage, the switching circuit 24 forcedly enters an off state. According to the present embodiment, the second voltage is a ground voltage. The first voltage is a voltage higher than the ground voltage and is, for example, an H logical voltage.

The reset circuit 26 is driven by the external power supply voltage VCC. The reset circuit 26 outputs a pre-reset signal PR that causes the reset signal RS to be a first voltage or a second voltage. According to the present embodiment, when the reset signal RS is set to the first voltage, the pre-reset signal PR is set to an H logical voltage. When the reset signal RS is set to the second voltage (the ground voltage according to the present embodiment), the pre-reset signal PR is set to an L logical voltage. The H logical voltage is a voltage that turns on the N channel MOSFET and turns off the P channel MOSFET. The L logical voltage is a voltage that is lower than the H logical voltage, turns off an N channel MOSFET, and turns on a P channel MOSFET.

The output circuit 28 is connected to the reset circuit 26, the reset wiring 32, and the reset switch 34. The output circuit 28 outputs the reset signal RS to the reset wiring 32. When the switching circuit 24 transitions to the first state or the second state, the reset signal RS is set to the first voltage. When the switching circuit 24 forcedly enters an off state, the reset signal RS is set to the second voltage corresponding to the ground voltage.

The output circuit 28 receives the pre-reset signal PR from the reset circuit 26. The output circuit 28 outputs a forced reset signal CR to the reset switch 34. For example, the output circuit 28 includes a first buffer circuit 52 and a second buffer circuit 54.

The first buffer circuit 52 is driven by the internal power supply voltage VDDC. The first buffer circuit 52 receives the pre-reset signal PR and outputs the reset signal RS having the same logical voltage as the logical voltage of the pre-reset signal PR. Specifically, when the pre-reset signal PR is logic indicating that the internal power supply voltage VDDC is supplied to the target circuit 12 (the H logical voltage according to the present embodiment), the first buffer circuit 52 outputs the reset signal RS of the first voltage. In addition, when the pre-reset signal PR is logic indicating that supply of the internal power supply voltage VDDC to the target circuit 12 should be cut off (the L logical voltage according to the present embodiment), the first buffer circuit 52 outputs the reset signal RS of the second voltage (ground voltage). Since the first buffer circuit 52 inputs a signal from the reset circuit 26 driven by the external power supply voltage VCC, the breakdown voltage of the input terminal is high.

The second buffer circuit 54 is driven by the external power supply voltage VCC. The second buffer circuit 54 receives the pre-reset signal PR and outputs the forced reset signal CR having a logical voltage obtained by inverting the logical voltage of the pre-reset signal PR. When the pre-reset signal PR is logic indicating that the internal power supply voltage VDDC is supplied to the target circuit 12 (the H logical voltage according to the present embodiment), the second buffer circuit 54 sets the forced reset signal CR to a voltage that turns off the N channel MOSFET (the L logical voltage). In addition, when the pre-reset signal PR is logic indicating that the supply of the internal power supply voltage VDDC to the target circuit 12 should be cut off (the L logical voltage according to the present embodiment), the second buffer circuit 54 sets the forced reset signal CR to a voltage that turns on the N channel MOSFET (the H logical voltage).

The control circuit 30 is driven by the internal power supply voltage VDDC. The control circuit 30 receives the reset signal RS from the output circuit 28. When the received reset signal RS is set to the first voltage, the control circuit 30 performs control so that the switching circuit 24 transitions to an on state or an off state. In addition, when the received reset signal RS is set to the second voltage (the ground voltage according to the present embodiment), the control circuit 30 performs control so that the switching circuit 24 enters the off state. In addition, the control circuit 30 outputs the control signal CT to the switching circuit 24. When the reset signal RS is the ground voltage corresponding to the second voltage, the control signal CT is set to the H logical voltage. When the reset signal RS is set to the first voltage, the control signal CT can be set to the H logical voltage or the L logical voltage. The switching circuit 24 enters an off state when the control signal CT is set to the H logical voltage and enters an on state when the control signal CT is set to the L logical voltage.

The control circuit 30 transitions the switching circuit 24 to an off state, for example, in a standby mode or during a period of time when the target circuit 12 does not operate. Therefore, the control circuit 30 eliminate the leakage current at the standby mode or when the target circuit 12 is not in operation and can reduce the power consumption of the semiconductor device 10.

The reset wiring 32 is provided between the output circuit 28 and the switching circuit 24. The reset wiring 32 transfers the reset signal RS output from the output circuit 28 from the output circuit 28 to the switching circuit 24 without passing through the control circuit 30.

The reset switch 34 is provided between the reset wiring 32 and a terminal that at the voltage corresponding to the second voltage. According to the present embodiment, the reset switch 34 short-circuits or cuts off between the reset wiring 32 and the ground voltage corresponding to the second voltage. The reset switch 34 is connected to the output circuit 28. The reset switch 34 performs switching according to the forced reset signal CR output from the second buffer circuit 54 driven by the external power supply voltage VCC. Specifically, when the forced reset signal CR is set to the L logical voltage, the reset switch 34 cuts off between the reset wiring 32 and the ground voltage. That is, when the pre-reset signal PR is logic indicating that the internal power supply voltage VDDC can be supplied to the target circuit 12 (the H logical voltage according to the present embodiment), the reset switch 34 cuts off between the reset wiring 32 and the ground voltage. In addition, when the forced reset signal CR is the H logical voltage, the reset switch 34 short-circuits between the reset wiring 32 and the ground voltage. That is, when the pre-reset signal PR is logic indicating that the supply of the internal power supply voltage VDDC to the target circuit 12 should be cut off (the L logical voltage according to the present embodiment), the reset switch 34 short-circuits between the reset wiring 32 and the ground voltage.

For example, the reset switch 34 is an N channel MOSFET. In this case, in the reset switch 34, the drain is connected to the reset wiring 32, and the source is connected to the ground voltage. Also, the forced reset signal CR is given to the gate of the reset switch 34.

The reset switch 34 in this manner can connect the reset wiring 32 to the ground voltage by the second buffer circuit 54 driven by the external power supply voltage VCC. That is, when the pre-reset signal PR is logic indicating that the supply of the internal power supply voltage VDDC to the target circuit 12 should be cut off (the L logical voltage according to the present embodiment), the reset switch 34 can forcedly set the reset signal RS to the ground voltage. Therefore, even when the control circuit 30 does not operate since the internal power supply voltage VDDC is lower than the normal operating voltage, the reset switch 34 can forcedly set the reset signal RS to the ground voltage.

The reset signal RS is received by the switching circuit 24. When the reset signal RS received from the reset wiring 32 is set to the ground voltage, the switching circuit 24 transitions to the off state regardless of the control by the control circuit 30. That is, even when the control circuit 30 does not operate since the internal power supply voltage VDDC is lower than the normal operating voltage, if the reset signal RS received via the reset wiring 32 is set to the ground voltage, the switching circuit 24 enters an off state and can cut off the supply of the internal power supply voltage VDDC to the target circuit 12.

According to the present embodiment, the switching circuit 24 includes a main switch 56 and an auxiliary switch 58. In addition, the switching circuit 24 includes a signal input terminal 48. The control signal CT output from the control circuit 30 is given to the signal input terminal 48.

According to the control signal CT given to the signal input terminal 48, the main switch 56 short-circuits or cuts off between the voltage input terminal 42 and the voltage output terminal 44. Specifically, when the control signal CT is the L logical voltage, the main switch 56 short-circuits between the voltage input terminal 42 and the voltage output terminal 44. In addition, when the control signal CT is set to the H logical voltage, the main switch 56 cuts off between the voltage input terminal 42 and the voltage output terminal 44. For example, the main switch 56 is a P channel MOSFET. In this case, in the main switch 56, the source is connected to the voltage input terminal 42, the drain is connected to the voltage output terminal 44, and the control signal CT is given to the gate.

The auxiliary switch 58 receives the reset signal RS via the reset wiring 32. That is, the auxiliary switch 58 directly receives the reset signal RS supplied via the reset wiring 32 without passing through the control circuit 30. Also, the auxiliary switch 58 short-circuits or cuts off between the input terminal of the control signal CT and the voltage input terminal 42 in the main switch 56 according to the received reset signal RS. Specifically, when the reset signal RS is at the first voltage, the auxiliary switch 58 cuts off between the input terminal of the control signal CT and the voltage input terminal 42 in the main switch 56. In addition, when the reset signal RS is set to the second voltage (ground voltage), the auxiliary switch 58 short-circuits between the input terminal of the control signal CT and the voltage input terminal 42 in the main switch 56. For example, the auxiliary switch 58 is the P channel MOSFET. In this case, in the auxiliary switch 58, the source is connected to the voltage input terminal 42, and the drain is connected to the input terminal (i.e., the gate) of the control signal CT in the main switch 56. Also, in the auxiliary switch 58, the gate is connected to the reset wiring 32, and the reset signal RS is given to the gate.

Accordingly, when the reset signal RS is at the first voltage, the auxiliary switch 58 cuts off between the input terminal of the control signal CT and the voltage input terminal 42 in the main switch 56. Therefore, when the reset signal RS is at the first voltage, the main switch 56 short-circuits or cuts off between the voltage input terminal 42 and the voltage output terminal 44 according to the control signal CT given from the control circuit 30. That is, when the reset signal RS is set to the first voltage, the switching circuit 24 transitions to an on state or an off state according to the control by the control circuit 30.

In addition, when the reset signal RS is at the second voltage (ground voltage), the auxiliary switch 58 short-circuits between the input terminal of the control signal CT and the voltage input terminal 42 in the main switch 56. When the gate and the source of the main switch 56 are short-circuited, the internal power supply voltage VDDC is applied to the gate of the main switch 56. That is, when the gate and the source of the main switch 56 are short-circuited, the H logical voltage is given to the gate of the main switch 56. When the H logical voltage is given to the gate, the main switch 56 cuts off between the voltage input terminal 42 and the voltage output terminal 44. That is, when the reset signal RS is set to the ground voltage, the switching circuit 24 transitions to the off state regardless of the control signal CT, that is, regardless of the control by the control circuit 30. Therefore, when the reset signal RS is the ground voltage, the switching circuit 24 can forcedly cut off the supply of the internal power supply voltage VDDC to the target circuit 12.

Figure 2:
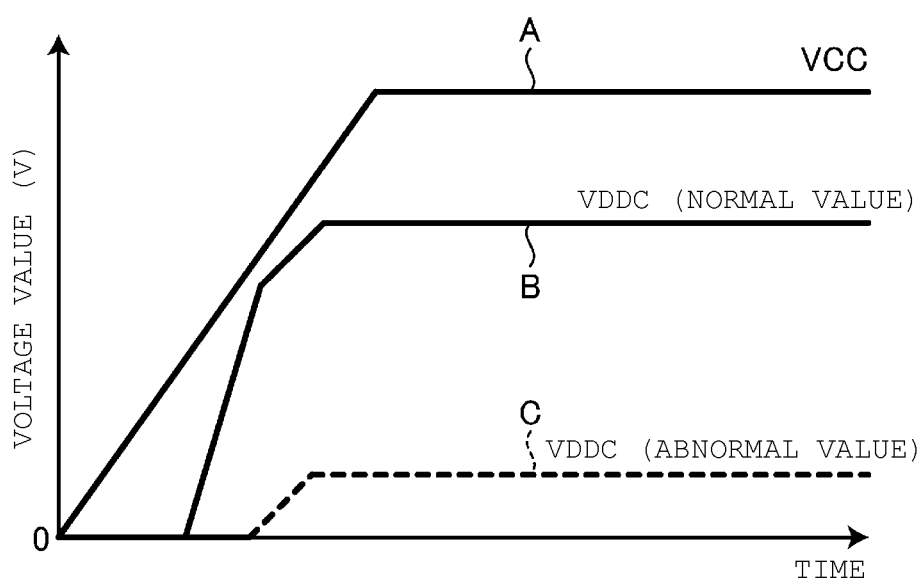
FIG. 2 is a diagram illustrating a change of an external power supply voltage and an internal power supply voltage at startup.

FIG. 2 is a diagram illustrating a change of the external power supply voltage VCC and the internal power supply voltage VDDC at the startup of the semiconductor device 10.

At the startup of the semiconductor device 10, as indicated by A in FIG. 2, the external power supply voltage VCC rises from the ground voltage (0 V) over time and is stabilized when reaching a predetermined voltage value. At the startup, as indicated by B in FIG. 2, if normal, the internal power supply voltage VDDC rises from ground voltage (0 V) over time to follow the external power supply voltage VCC after the external power supply voltage VCC rises in a certain degree and is stabilized to a normal operating voltage (normal value) after a predetermined period of time elapses.

However, at the startup, the internal power supply voltage VDDC rises from the ground voltage (0 V), until reaching the normal operation voltage, and passes through the voltage at which the control circuit 30 cannot operate. During the period of time of the voltage at which the control circuit 30 cannot operate, if the switching circuit 24 enters an on state, the target circuit 12 operates, the current starts to flow, and the generated current and the current amount that can be supplied by the voltage regulator 22 may be balanced. In this manner, during the period of time of the voltage at which the control circuit 30 cannot operate, when the current generated by the switching circuit 24 entering an on state and the current amount that can be supplied by the voltage regulator 22 are balanced, the internal power supply voltage VDDC is stabilized at a voltage lower than the normal operation voltage (abnormal value) as indicated by C in FIG. 2. In this case, the control circuit 30 does not operate and cannot perform control so that the switching circuit 24 enters an off state.

In contrast, the power supply circuit 20 according to the present embodiment includes the reset wiring 32 that transfers the reset signal RS to the switching circuit 24 without passing through the control circuit 30. Also, the switching circuit 24 can be forcedly transitioned to the off state by the reset signal RS received from the reset wiring 32, regardless of the control by the control circuit 30. Therefore, even when the control circuit 30 does not operate since the internal power supply voltage VDDC is a voltage lower than a desired voltage, the power supply circuit 20 can transition the switching circuit 24 to an off state to cut off the supply of the internal power supply voltage VDDC to the target circuit 12. Therefore, for example, at the startup, the power supply circuit 20 can reliably raise the internal power supply voltage VDDC to the normal operation voltage.

Further, the power supply circuit 20 according to the present embodiment includes the reset switch 34 that short-circuits or cuts off between the reset wiring 32 and the ground voltage. The reset switch 34 is switched by the forced reset signal CR output from a circuit driven by the external power supply voltage VCC, for example, the second buffer circuit 54 in the output circuit 28. Also, when the reset signal RS received from the reset wiring 32 is set to the second voltage (ground voltage), the switching circuit 24 transitions to the off state regardless of the control by the control circuit 30.

Even when the internal power supply voltage VDDC is a low voltage, the external power supply voltage VCC reliably rises to a predetermined voltage at the startup. Therefore, even when the internal power supply voltage VDDC is a voltage lower than the normal operation voltage, the second buffer circuit 54 in the output circuit 28 that is a circuit driven by the external power supply voltage VCC can reliably operate. Therefore, even when the internal power supply voltage VDDC is a voltage lower than the normal operation voltage, the power supply circuit 20 can reliably cause the switching circuit 24 to enter an off state by using the reset signal RS as the ground voltage.

As above, even when the internal power supply voltage VDDC is a low voltage, the power supply circuit 20 according to the present embodiment can reliably cut off the supply of the internal power supply voltage VDDC to the target circuit 12. Therefore, the power supply circuit 20 can avoid the internal power supply voltage VDDC from stabilizing at a low voltage, for example, by reliably raising the internal power supply voltage VDDC to the normal operation voltage at the startup. Therefore, the power supply circuit 20 can be designed without considering a circuit operation when the internal power supply voltage VDDC is a low voltage. For example, if the power supply circuit 20 is not used, the supply voltage at which the control circuit 30 cannot operate normally needs to be checked. Similarly, the supply voltage at which the switching circuit 24 cannot operate normally needs to be checked. If either the control circuit 30 or the switching circuit 24 cannot operate normally, the switching circuit 24 will turn ON. Then, the leakage current of the target circuit 12 that occurs at this supply voltage needs to be estimated and it is necessary to check whether a current greater than that leakage current can be supplied by the voltage regulator 22. All of these checks need to be done accurately at low supply voltages. The power supply circuit 20 does not need to consider all of these factors. As a result, the power supply circuit 20 can be easily designed.

Second Embodiment

Figure 3:
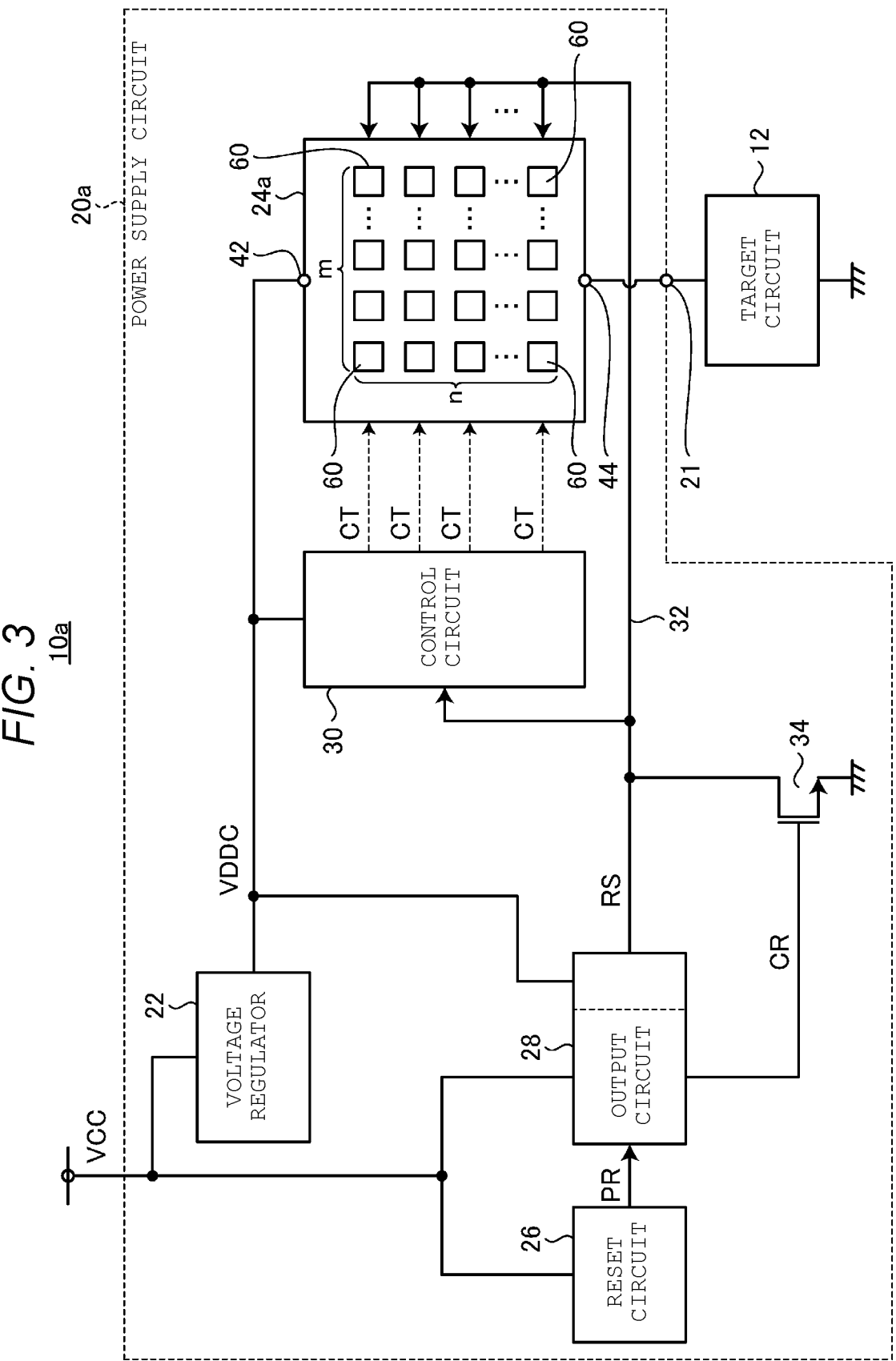
FIG. 3 is a diagram illustrating a configuration of a power supply circuit according to a second embodiment.

FIG. 3 is a diagram illustrating a configuration of a semiconductor device 10*a* including a power supply circuit 20*a* according to the second embodiment, which includes substantially the same functions and configurations as the power supply circuit 20 provided in the semiconductor device 10. In the description of the semiconductor device 10*a*, circuits, signals, and the like having the same functions and configurations as in the first embodiment are denoted by the same reference numerals, and detailed descriptions thereof are omitted.

According to the second embodiment, the power supply circuit 20a includes a switching circuit 24a instead of the switching circuit 24 according to the first embodiment. The switching circuit 24a includes a plurality of sub-switching circuits 60. For example, the switching circuit 24a includes, for example, m (m is an integer of 1 or more)×n (n is an integer of 2 or more) sub-switching circuits 60. The plurality of sub-switching circuits 60 (for example, the m×n sub-switching circuits 60) each are provided between the voltage input terminal 42 and the voltage output terminal 44. That is, the m×n sub-switching circuits 60 each are provided between the voltage regulator 22 and the terminal 21. In addition, the plurality of sub-switching circuits 60 (for example, the m×n sub-switching circuits 60) each are connected to the control circuit 30. In addition, the plurality of sub-switching circuits 60 (for example, the m×n sub-switching circuits 60) each are connected to the reset switch 34 via the reset wiring 32.

The plurality of sub-switching circuits 60 each perform the same operation as the switching circuit 24 according to the first embodiment. The plurality of sub-switching circuits 60 each transition to an on state in which the internal power supply voltage VDDC generated from the voltage regulator 22 is supplied to the terminal 21 or an off state in which the supply of the internal power supply voltage VDDC to the terminal 21 is cut off. Specifically, the plurality of sub-switching circuits 60 each short-circuit between the voltage input terminal 42 and the voltage output terminal 44 in an on state. The plurality of sub-switching circuits 60 each cut off between the voltage input terminal 42 and the voltage output terminal 44 in an off state.

The plurality of sub-switching circuits 60 each transition to an on state or an off state according to the voltage of the control signal CT output from the control circuit 30. The plurality of sub-switching circuits 60 each enter an off state when the control signal CT is the H logical voltage and enters an on state when the control signal CT is the L logical voltage.

In addition, the plurality of sub-switching circuits 60 each receive the reset signal RS supplied via the reset wiring 32. Also, the plurality of sub-switching circuits 60 each enter a state of transitioning to an on state or an off state by the control signal CT according to the reset signal RS received from the reset wiring 32 or a state of forcedly entering an off state. More specifically, the plurality of sub-switching circuits 60 each enter a state of transitioning to an on state or an off state by the control signal CT when the reset signal RS is at the first voltage. In addition, the plurality of sub-switching circuits 60 each forcedly enter an off state when the reset signal RS is at the second voltage (ground voltage). Therefore, even when the control circuit 30 does not operate since the internal power supply voltage VDDC is lower than the normal operation voltage, if the reset signal RS received via the reset wiring 32 is at the second voltage (ground voltage), the plurality of sub-switching circuits 60 each enter an off state and can cut off the supply of the internal power supply voltage VDDC to the target circuit 12.

Figure 4:
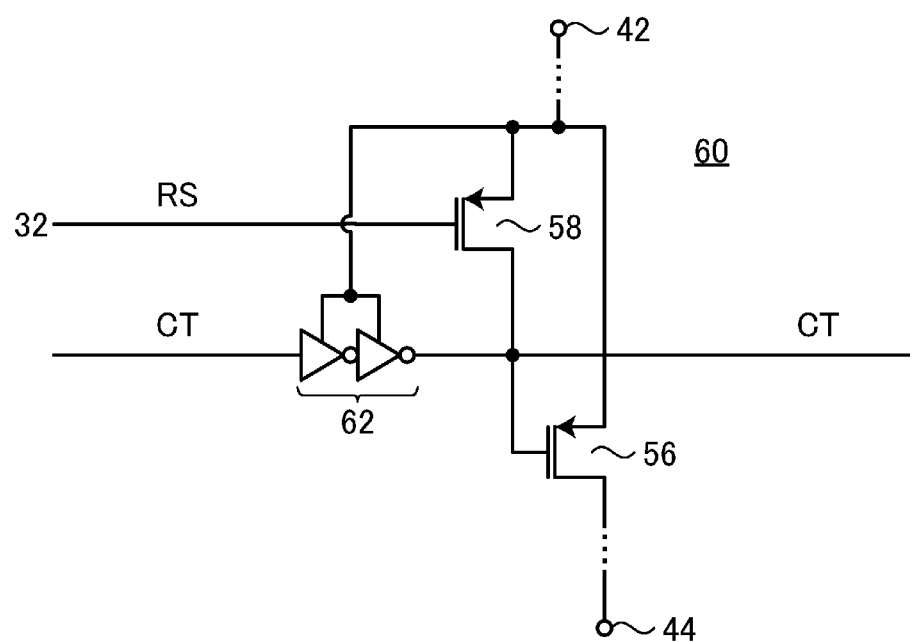
FIG. 4 is a diagram illustrating a configuration of a sub-switching circuit.

FIG. 4 is a diagram illustrating a configuration of the sub-switching circuit 60. The sub-switching circuit 60 includes the main switch 56, the auxiliary switch 58, and a transfer buffer circuit 62.

The main switch 56 short-circuits or cuts off between the voltage input terminal 42 and the voltage output terminal 44 according to the control signal CT. Specifically, when the control signal CT is the L logical voltage, the main switch 56 short-circuits between the voltage input terminal 42 and the voltage output terminal 44. When the control signal CT is the H logical voltage, the main switch 56 cuts off between the voltage input terminal 42 and the voltage output terminal 44. For example, the main switch 56 is the P channel MOSFET. In this case, in the main switch 56, the source is connected to the voltage input terminal 42, and the drain is connected to the voltage output terminal 44. Also, in the main switch 56, the control signal CT is given to the gate. Therefore, when the control signal CT is the L logical voltage, the sub-switching circuit 60 transitions to an on state. Also, when the control signal CT is the H logical voltage, the sub-switching circuit 60 can transition to an off state.

The auxiliary switch 58 receives the reset signal RS via the reset wiring 32. Also, the auxiliary switch 58 short-circuits or cuts off between the gate that is the input terminal of the control signal CT and the source connected to the voltage input terminal 42 in the main switch 56 according to the received reset signal RS. Specifically, when the reset signal RS is at the first voltage, the auxiliary switch 58 cuts off between the gate and the source of the main switch 56. In addition, when the reset signal RS is at the second voltage (ground voltage), the auxiliary switch 58 short-circuits between the gate and the source of the main switch 56. For example, the auxiliary switch 58 is the P channel MOSFET. In this case, in the auxiliary switch 58, the source is connected to the voltage input terminal 42, the drain is connected to the gate of the main switch 56. Also, in the auxiliary switch 58, the gate is connected to the reset wiring 32, and the reset signal RS is given to the gate.

Therefore, when the reset signal RS is at the first voltage, the auxiliary switch 58 cuts off between gate and the source of the main switch 56. Therefore, when the reset signal RS is at the first voltage, the main switch 56 short-circuits or cuts off between the voltage input terminal 42 and the voltage output terminal 44 according to the control signal CT given from the control circuit 30. Therefore, when the reset signal RS is at the first voltage, the sub-switching circuit 60 transitions to an on state or an off state according to the control by the control circuit 30.

In addition, when the reset signal RS is at the second voltage, the auxiliary switch 58 short-circuits between gate and the source of the main switch 56. When the gate and the source of the main switch 56 are short-circuited, the internal power supply voltage VDDC is applied to the gate of the main switch 56. That is, when the gate and the source of the main switch 56 is short-circuited, the H logical voltage is given to the gate of the main switch 56. When the H logical voltage is given to the gate, the main switch 56 cuts off between the voltage input terminal 42 and the voltage output terminal 44. Therefore, when the reset signal RS is at the second voltage, the sub-switching circuit 60 transitions to an off state regardless of the control by the control circuit 30. Therefore, when the reset signal RS is at the second voltage, the sub-switching circuit 60 can forcedly cut off the supply of the internal power supply voltage VDDC to the target circuit 12.

The transfer buffer circuit 62 receives, buffers, and outputs the control signal CT. The transfer buffer circuit 62 delays the received control signal CT for a predetermined period of time and output the control signal CT. The transfer buffer circuit 62 may receive the control signal CT from the control circuit 30 and may receive the control signal CT output from the other sub-switching circuit 60. The control signal CT output from the output terminal of the transfer buffer circuit 62 may be given to the gate of the main switch 56, and the control signal CT given to the input terminal of the transfer buffer circuit 62 may be given to the gate of the main switch 56.

Figure 5:
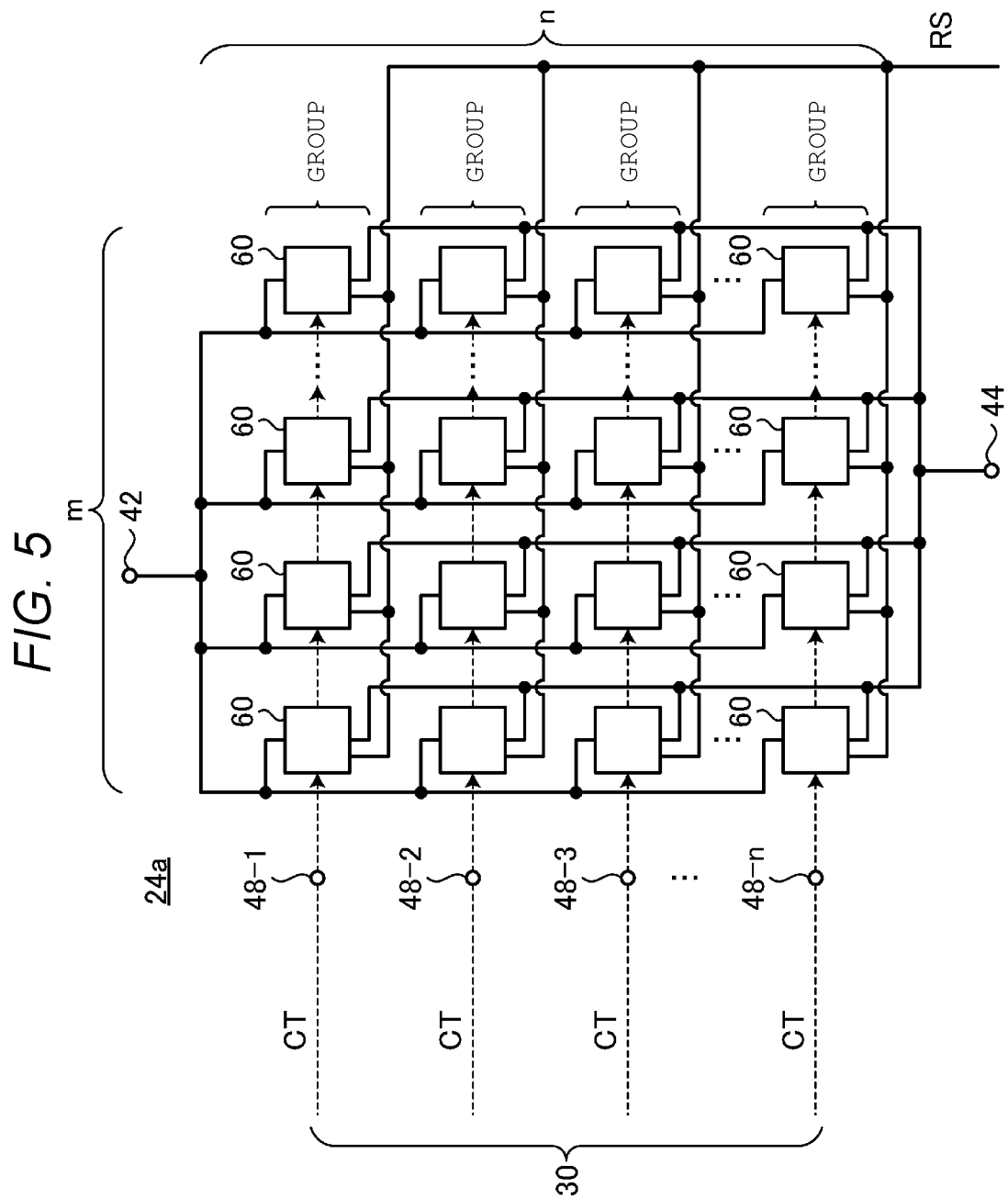
FIG. 5 is a diagram illustrating a configuration of a switching circuit according to the second embodiment.

FIG. 5 is a diagram illustrating a configuration of the switching circuit 24a according to the second embodiment. The plurality of sub-switching circuits 60 each are divided into a plurality of groups including two of more sub-switching circuits 60. For example, in the example of FIG. 5, n groups each include m sub-switching circuits 60.

The two or more sub-switching circuits 60 provided in each of the plurality of groups are connected in cascade to sequentially transfer the control signals CT. For example, in the example of FIG. 5, the m sub-switching circuits 60 are connected in cascade to sequentially transfer the control signals CT.

Among the two or more sub-switching circuits 60 connected in cascade, the leading sub-switching circuit 60 receives the control signal CT from the control circuit 30. Also, the two or more sub-switching circuits 60 each output the control signal CT to the sub-switching circuit 60 in the latter part via the transfer buffer circuit 62. That is, the two or more sub-switching circuits 60 each delay the received control signal CT for a predetermined period of time and output the sub-switching circuits 60 in the latter part. In such a configuration, the two or more sub-switching circuits 60 provided in the plurality of groups can shift timings of transitioning to an on state and an off state by a predetermined period of time.

In addition, the switching circuit 24a may include the signal input terminals 48 different from each other for each of the plurality of groups. For example, in the example of FIG. 5, the switching circuit 24a includes the first signal input terminal 48-1 to the n-th signal input terminal 48-n.

Further, the control circuit 30 may give the control signals CT different from each other for each of the plurality of groups. In this case, the control circuit 30 can vary the output timings of the control signal CT for each of the plurality of groups. For example, the control circuit 30 outputs the control signal CT by a predetermined period of time for each group or every predetermined number of groups. Therefore, the control circuit 30 can shift timings of transitioning an on state and an off state by a predetermined period of time for each group or every predetermined number of groups.

When the internal power supply voltage VDDC is supplied from the voltage regulator 22 to the target circuit 12, the switching circuit 24a having such a configuration increases the current amount by a predetermined amount over time. In contrast, when the supply of the internal power supply voltage VDDC from the voltage regulator 22 to the target circuit 12 is cut off, the switching circuit 24a can reduce the current amount by a predetermined amount over time.

Figure 6:
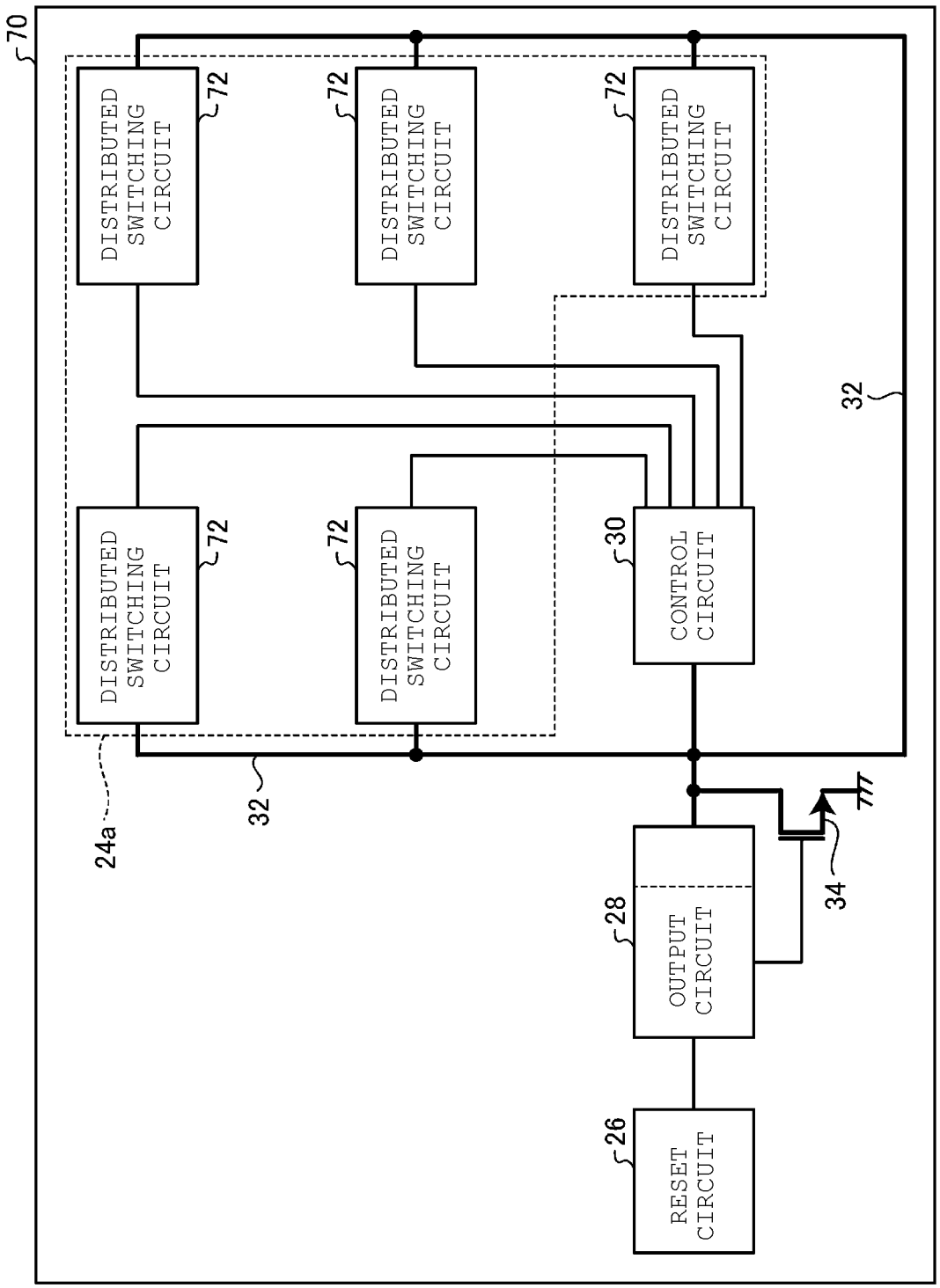
FIG. 6 is a diagram illustrating an arrangement example of the power supply circuit according to the second embodiment, on a semiconductor chip.

FIG. 6 is a diagram illustrating an arrangement example of the power supply circuit 20a according to the second embodiment, on a semiconductor chip 70. In addition, in FIG. 6, although the target circuit 12, the voltage regulator 22, wiring for transmitting the external power supply voltage VCC, and wiring for transmitting the internal power supply voltage VDDC are not illustrated, these are formed in any area of a die of a semiconductor chip 70.

The switching circuit 24a is divided, for example, into a plurality of distributed switching circuits 72. The plurality of distributed switching circuits 72 each include the plurality of sub-switching circuits 60 provided in one or a plurality of groups.

The plurality of distributed switching circuits 72 each are located at positions different from each other in the die the semiconductor chip 70 in a distributed manner. In addition, the reset wiring 32 electrically connects an area where the output circuit 28 and the reset switch 34 are formed and a plurality of areas where the plurality of distributed switching circuits 72 are provided, respectively.

Here, the plurality of distributed switching circuits 72 each include, for example, many MOSFETs that configure the auxiliary switch 58. The plurality of distributed switching circuits 72 respectively switches many MOSFETs according to the reset signals RS. Therefore, when the level of the reset signal RS is changed, a very large inrush current flows through the reset wiring 32. Therefore, at the time of changing the level of the reset signal RS, the reset wiring 32 is formed in a sufficiently thick wiring width so that a sufficiently large current can flow.

Third Embodiment

Figure 7:
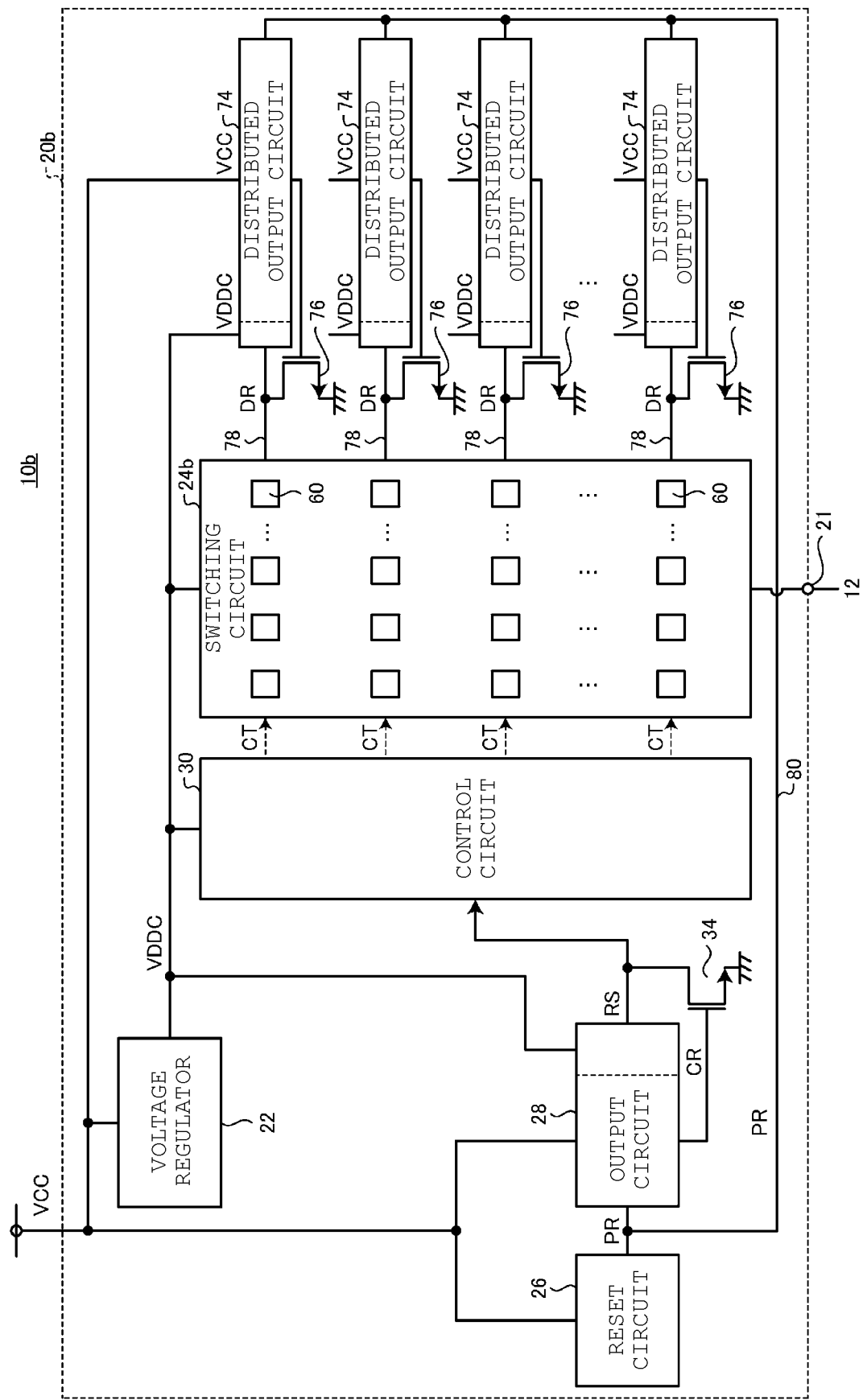
FIG. 7 is a diagram illustrating a configuration of a power supply circuit according to a third embodiment.

FIG. 7 is a diagram illustrating a configuration of a power supply circuit 20b according to a third embodiment. In addition, the power supply circuit 20b provided in a semiconductor device 10b has substantially the same functions and configurations as the power supply circuit 20a provided in the semiconductor device 10a. In the description of the semiconductor device 10b, circuits, signals, and the like having the same functions and configurations as in the second embodiment are denoted by the same reference numerals, and detailed descriptions thereof are omitted.

In addition to the configuration of the power supply circuit 20a according to the second embodiment, the power supply circuit 20b according to the third embodiment includes a plurality of distributed output circuits 74 and a plurality of distributed reset switches 76. According to the third embodiment, the power supply circuit 20b includes a switching circuit 24b instead of the switching circuit 24a according to the second embodiment. In addition, the power supply circuit 20b according to the third embodiment include a plurality of pieces of distributed reset wiring 78 and pre-reset wiring 80 instead of the reset wiring 32.

The pre-reset wiring 80 transfers the pre-reset signal PR output from the reset circuit 26 to the plurality of distributed output circuits 74.

Similarly to the switching circuit 24a according to the second embodiment, the switching circuit 24b includes the sub-switching circuits 60. The plurality of sub-switching circuits 60 provided in the switching circuit 24b are divided into a plurality of groups. For example, the m×n sub-switching circuits 60 are divided into n groups each including the m sub-switching circuits 60. The two or more sub-switching circuits 60 provided in each group correspond to one of the plurality of distributed output circuits 74. The two or more sub-switching circuits 60 provided in each group are connected to the corresponding distributed output circuit 74 among the plurality of distributed output circuits 74 via one piece of the distributed reset wiring 78 among the plurality of pieces of the distributed reset wiring 78. The two or more sub-switching circuits 60 provided in each group receive a distributed reset signal DR via the connected distributed reset wiring 78 instead of receiving the reset signal RS from the reset wiring 32.

The plurality of distributed output circuits 74 each correspond to any of the plurality of groups dividing the plurality of sub-switching circuits 60 provided in the switching circuit 24b. The plurality of distributed output circuits 74 may correspond to one group of the plurality of groups or may correspond to a predetermined number of two or more groups.

The plurality of distributed output circuits 74 has the same configuration as the output circuit 28. The plurality of distributed output circuits 74 receive the pre-reset signal PR output from the reset circuit 26 via the pre-reset wiring 80. Also, the plurality of distributed output circuits 74 each output the distributed reset signal DR. The distributed reset signal DR is a signal similar to the reset signal RS. That is, when supply of the internal power supply voltage VDDC from the switching circuit 24b to the target circuit 12 is cut off, the distributed reset signal DR is set to the second voltage (ground voltage). In addition, when the switching circuit 24b supplies or cuts off the internal power supply voltage VDDC to the target circuit 12 according to the control by the control circuit 30, the distributed reset signal DR is set to the first voltage.

The plurality of pieces of the distributed reset wiring 78 correspond to the plurality of distributed output circuits 74. That is, the plurality of pieces of the distributed reset wiring 78 each correspond to any one distributed output circuit 74 among the plurality of distributed output circuits 74. The plurality of pieces of the distributed reset wiring 78 each transfer the distributed reset signal DR output from the corresponding distributed output circuit 74 to the plurality of sub-switching circuits 60 belonging to the corresponding group provided in the switching circuit 24b without passing through the control circuit 30.

The plurality of distributed reset switches 76 correspond to the plurality of distributed output circuits 74. More specifically, the plurality of distributed reset switches 76 each correspond to any one distributed output circuit 74 among the plurality of distributed output circuits 74. The plurality of distributed reset switches 76 each short-circuits or cuts off between the correspond distributed reset wiring 78 among the plurality of pieces of the distributed reset wiring 78 and the ground voltage. The plurality of distributed reset switches 76 performs switching according to the signal output from the circuits driven by the external power supply voltage VCC.

According to the present embodiment, the plurality of distributed reset switches 76 each perform switching according to the forced reset signal CR output from the second buffer circuit 54 provided in the correspond distributed output circuits 74. The plurality of distributed reset switches 76 each have the similar configuration as the reset switch 34 and perform the similar operation.

Also, when the distributed reset signal DR received from the corresponding distributed output circuit 74 among the plurality of distributed output circuits 74 is at the second voltage (ground voltage) via the distributed reset wiring 78, the plurality of sub-switching circuits 60 each transition to an off state regardless of the control by the control circuit 30.

Figure 8:
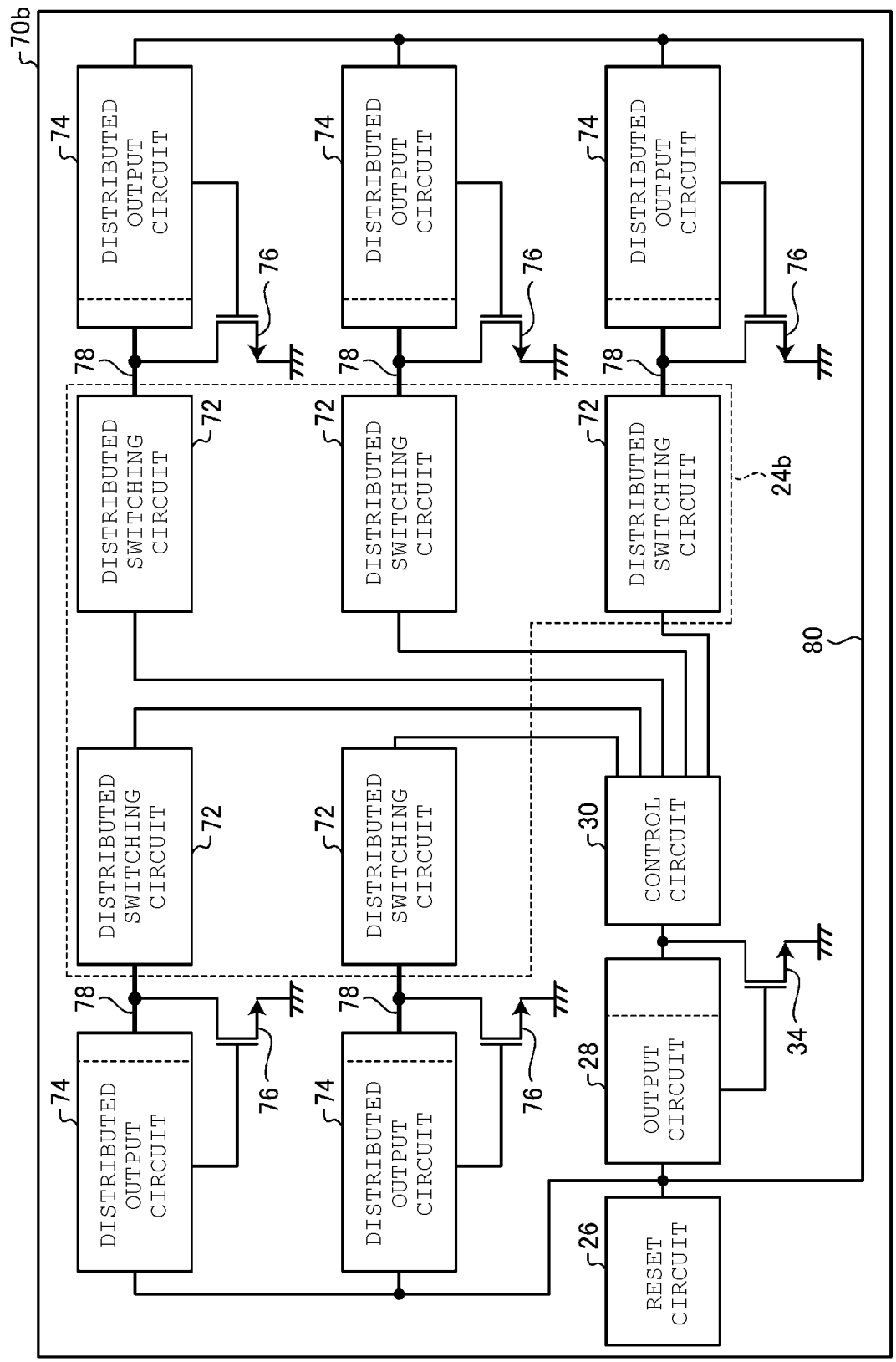
FIG. 8 is a diagram illustrating an arrangement example of the power supply circuit according to the third embodiment, on a semiconductor chip.

FIG. 8 is a diagram illustrating an arrangement example of the power supply circuit 20b according to the third embodiment, in a semiconductor chip 70b. In the description of the semiconductor chip 70b illustrated in FIG. 8, differences from the configuration of the semiconductor chip 70 illustrated in FIG. 6 is described.

The plurality of distributed output circuits 74 are respectively located near the distributed switching circuits 72 including one or the plurality of sub-switching circuits 60 belonging to the corresponding group. In addition, the plurality of distributed reset switches 76 each are located near the corresponding distributed output circuits 74.

Therefore, the distance between each of the distributed switching circuits 72 and the corresponding distributed output circuit 74 is relatively short. In contrast, the distance between the reset circuit 26 and each of the plurality of distributed output circuits 74 is relatively long. Accordingly, the wiring length of each of the plurality of pieces of the distributed reset wiring 78 is shorter than the wiring of the pre-reset wiring 80.

In addition, each of the plurality of distributed output circuits 74 is configured with relatively smaller number of MOSFETs. Therefore, when the logic of the pre-reset signal PR is changed, a relatively smaller inrush current flows through the pre-reset wiring 80. Therefore, the pre-reset wiring 80 may be formed in a relatively thinner wiring width. For example, the wiring width of the pre-reset wiring 80 can be thinner than the wiring width of the reset wiring 32.

In contrast, the plurality of distributed switching circuits 72 each include, for example, many MOSFETs that configure the auxiliary switch 58. The plurality of distributed switching circuits 72 switch many MOSFET according to the distributed reset signal DR. Therefore, when the level of the distributed reset signal DR is changed, a very large inrush current flows through each of the plurality of pieces of the distributed reset wiring 78. Therefore, when the level of the distributed reset signal DR is changed, the plurality of pieces of the distributed reset wiring 78 each is formed in a sufficiently thick wiring width compared with the pre-reset wiring 80 so that a sufficiently large current can flow.

By locating the circuits with respect to the semiconductor chip 70b, in the power supply circuit 20b according to the third embodiment, the wiring width of the pre-reset wiring 80 having a relatively longer wiring length can be reduced. Therefore, since the wiring length of the pre-reset wiring 80 having a thin wiring width is lengthened, and the wiring length of the distributed reset wiring 78 having a thick wiring width is shortened, the power supply circuit 20b according to the third embodiment can be effectively located.

Fourth Embodiment

Figure 9:
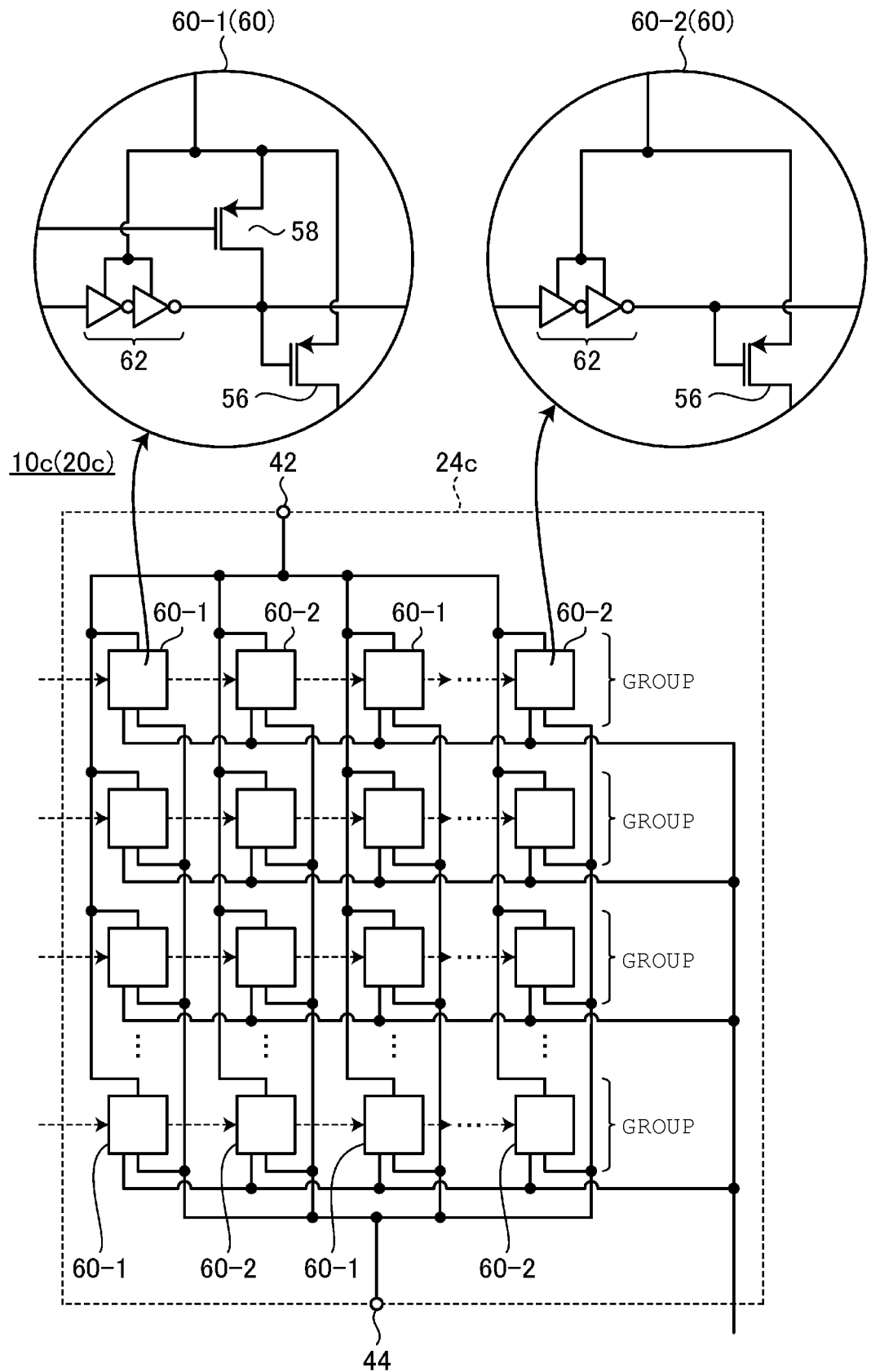
FIG. 9 is a diagram illustrating a configuration of a switching circuit in a power supply circuit according to a fourth embodiment.

FIG. 9 is a diagram illustrating a configuration of a switching circuit 24c in a power supply circuit 20c according to a fourth embodiment. In addition, a semiconductor device 10c including the switching circuit 24c has substantially the same functions and configurations as the semiconductor device 10a and the semiconductor device 10b. In the description of the semiconductor device 10c, circuits, signals, and the like having the same functions and configurations as described in the second and third embodiments are denoted by the same reference numerals, and detailed descriptions thereof are omitted.

The semiconductor device 10c includes the switching circuit 24c instead of the switching circuit 24a or the switching circuit 24b. The switching circuit 24c include one or a plurality of first sub-switching circuits 60-1 and one or a plurality of second sub-switching circuits 60-2 as the plurality of sub-switching circuits 60. That is, a part of the plurality of sub-switching circuits 60 is the one or the plurality of first sub-switching circuits 60-1. Also, the other part of the plurality of sub-switching circuits 60 that are not the one or the plurality of first sub-switching circuits 60-1 is the one or the plurality of second sub-switching circuits 60-2.

The first sub-switching circuits 60-1 each has the same configuration as the sub-switching circuit 60 illustrated in FIG. 4. That is, the first sub-switching circuits 60-1 each include the main switch 56, the auxiliary switch 58, and the transfer buffer circuit 62.

In addition, the second sub-switching circuits 60-2 each have a configuration from which the auxiliary switch 58 is excluded from the configuration of the sub-switching circuit 60 illustrated in FIG. 4. That is, the second sub-switching circuits 60-2 each include the main switch 56 and the transfer buffer circuit 62.

The switching circuit 24c having such a configuration may eliminate the auxiliary switch 58 of the part of the sub-switching circuits 60 among the plurality of sub-switching circuits 60, and thus the circuit configuration may be reduced. Also, in the switching circuit 24c having such a configuration, even when the reset signal RS is at the second voltage (ground voltage), the second sub-switching circuits 60-2 each do not enter an off state, and the current may be supplied to the target circuit 12. However, if the current flown by each of the second sub-switching circuits 60-2 is sufficiently smaller than a suppliable current amount of the voltage regulator 22, even if the current is supplied to the target circuit 12 at the startup, the internal power supply voltage VDDC can rise to the normal operation voltage.

However, when the current flown by each of the second sub-switching circuits 60-2 is larger than the suppliable current amount of the voltage regulator 22, the internal power supply voltage VDDC may not rise to the normal operation voltage at the startup. Therefore, it is required to design the number of the second sub-switching circuits 60-2 so that the current flown by each of the second sub-switching circuits 60-2 is sufficiently smaller than the suppliable current amount of the voltage regulator 22.

In addition, in the plurality of sub-switching circuits 60 provided in each group, the control signal CT is transmitted by the plurality of transfer buffer circuits 62 connected in cascade. When being operated by the internal power supply voltage VDDC, the auxiliary switch 58 forcedly pulls up the control signal CT to the internal power supply voltage VDDC.

Fifth Embodiment

Figure 10:
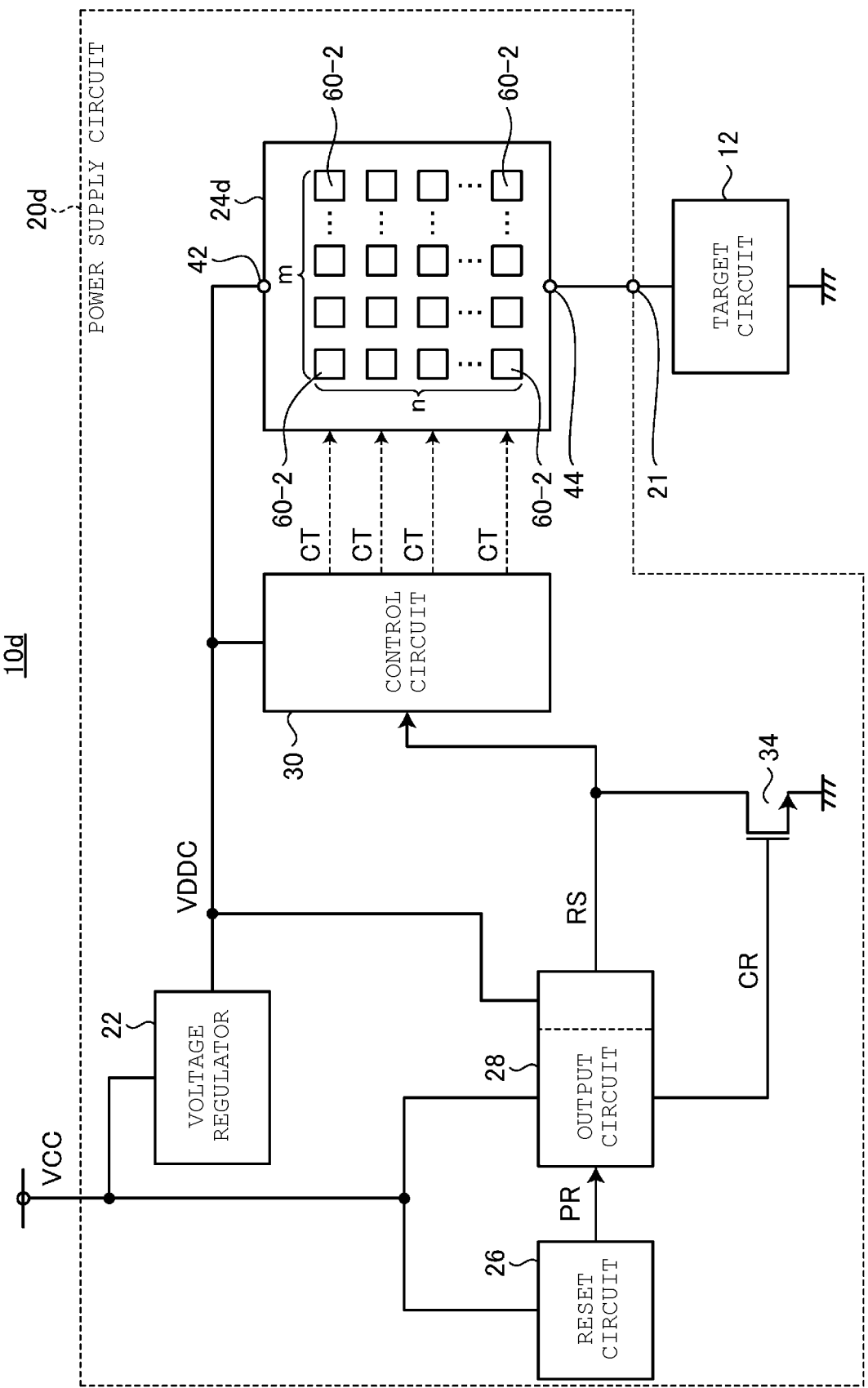
FIG. 10 is a diagram illustrating a configuration of a power supply circuit according to a fifth embodiment.

FIG. 10 is a diagram illustrating a configuration of a power supply circuit 20d according to the fifth embodiment. In addition, a semiconductor device 10d has substantially the same functions and configurations as the semiconductor device 10a. In the description of the semiconductor device 10d, circuits, signals, and the like having the same functions and configurations as in the second embodiment are denoted by the same reference numerals, and detailed descriptions thereof are omitted.

The semiconductor device 10d includes the power supply circuit 20d instead of the power supply circuit 20a according to the second embodiment. The power supply circuit 20d according to the fifth embodiment has a configuration not including the reset wiring 32 that transfers the reset signal RS to a switching circuit 24d compared with the power supply circuit 20a according to the second embodiment. In addition, the plurality of sub-switching circuits 60 provided in the switching circuit 24d each have a configuration not including the auxiliary switch 58. That is, in the switching circuit 24d, the plurality of sub-switching circuits 60 each have the same configuration as the second sub-switching circuit 60-2.

The power supply circuit 20d according to the fifth embodiment can reliably supply the reset signal RS to the control circuit 30, even if the internal power supply voltage VDDC has the low voltage. Therefore, even when the internal power supply voltage VDDC is a low voltage, if at least the control circuit 30 operates, the power supply circuit 20d can reliably cut off the supply of the internal power supply voltage VDDC to the target circuit 12.

(Application Example of Power Supply Circuit 20)

Figure 11:
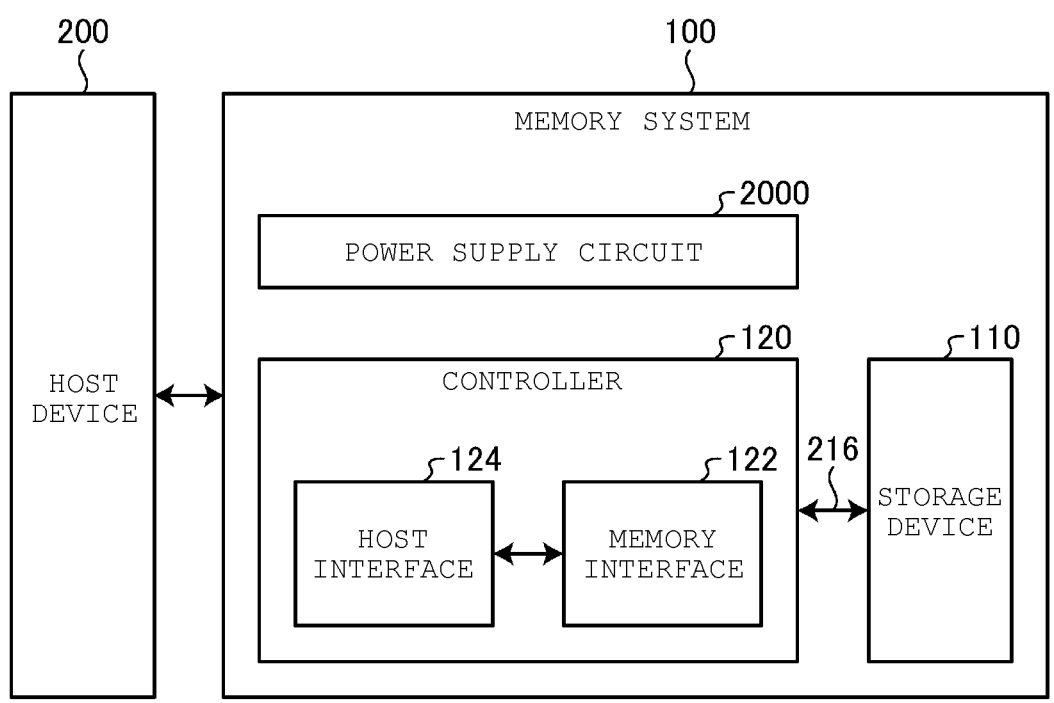
FIG. 11 is a diagram illustrating a configuration of a memory system to which power supply circuits related to the first to fifth embodiments are applied.

FIG. 11 is a diagram illustrating a configuration of a memory system 100 to which the power supply circuits 20, 20a, 20b, 20c, and 20d related to the first to fifth embodiments are applied.

The memory system 100 is connected to a host device 200 via a bus. The memory system 100 has a function as an external storage device of the host device 200. The memory system 100 is, for example, a solid state drive (SSD) or a universal flash storage (UFS) device. The host device 200 is, for example, an information processing device including a computer or processor.

The memory system 100 includes a power supply circuit 2000, a storage device 110, and a controller 120. The storage device 110 and the controller 120 are connected to each other via bus wiring 216.

The power supply circuit 2000 has the same configuration as the power supply circuit 20, 20a, 20b, 20c, or 20d according to any one of the first to fifth embodiments. The power supply circuit 2000 supplies the internal power supply voltage VDDC to the controller 120.

The storage device 110 is one or a plurality of nonvolatile semiconductor memories. The nonvolatile semiconductor memory is, for example, a NAND-type flash memory. In addition, the storage device 110 may be one or a plurality of volatile semiconductor memories such as DRAMs.

The controller 120 transmits and receives information to and from the host device 200. The controller 120 performs a memory access for writing and reading data with respect to the storage device 110 according to the request from the host device 200.

The controller 120 includes a memory interface 122 (memory I/F). The memory interface 122 transmits and receives a signal to and from the storage device 110 via the bus wiring 216. In addition, the controller 120 includes a host interface 124. The host interface 124 transmits and receives data to and from the host device 200 via a bus corresponding to a predetermined interface standard.

By being applied to the memory system 100, the power supply circuit 2000 can reliably operate the memory system 100, for example, at the startup, by reliably raise the internal power supply voltage VDDC to the normal operation voltage.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A power supply device comprising:
    a regulator circuit configured to generate a second power supply voltage based on an input first power supply voltage;
    a voltage output terminal from which the second power supply voltage is to be output;
    a switching circuit that is provided between the regulator circuit and the voltage output terminal and is configured to transition between a first state in which the second power supply voltage is supplied to the voltage output terminal and a second state in which supply of the second power supply voltage to the voltage output terminal is cut off;
a first control circuit configured to output a reset signal that is set to a first voltage or a second voltage different from the first voltage;
a second control circuit configured to be driven by the second power supply voltage and to perform control so that the switching circuit transitions to the first state or the second state when the reset signal is at the first voltage; and
a reset wiring electrically connecting the first control circuit and the switching circuit without passing through the second control circuit, wherein
the switching circuit is configured to transition to the second state regardless of the control by the second control circuit when the reset signal received via the reset wiring is set to the second voltage.

2. The power supply device according to claim 1, wherein the first control circuit further includes a reset switch configured to electrically connect or disconnect an electrical path between the reset wiring and a power supply terminal that is at a voltage corresponding to the second voltage, according to a forced reset signal output from a circuit driven by the first power supply voltage.

3. The power supply device according to claim 2, wherein the second control circuit is configured to output a control signal set to the H logical voltage when the reset signal is at the second voltage, and set to the L logical voltage lower than the H logical voltage or the H logical voltage when the reset signal is at the first voltage.

4. The power supply device according to claim 3, wherein the switching circuit includes
a voltage input terminal through the second power supply voltage is to be received,
a signal input terminal through which the control signal is to be received,
a main switch configured to electrically connect an electrical path between the voltage input terminal and the voltage output terminal when the control signal is set to the L logical voltage, and to electrically disconnect the electrical path between the voltage input terminal and the voltage output terminal when the control signal is set to the H logical voltage, and
an auxiliary switch configured to electrically disconnect an electrical path between the signal input terminal and the voltage input terminal when the reset signal is at the first voltage, and to electrically connect the electrical path between the signal input terminal and the voltage input terminal when the reset signal is at the second voltage.

5. The power supply device according to claim 3, wherein the switching circuit is provided between the regulator circuit and the voltage output terminal and includes a voltage input terminal through the second power supply voltage is to be received, a signal input terminal through which the control signal is to be received, and a plurality of sub-switching circuits, and
each of the plurality of sub-switching circuits includes
a main switch configured to electrically connect an electrical path between the voltage input terminal and the voltage output terminal when the control signal is set to the L logical voltage, and to electrically disconnect the electrical path between the voltage input terminal and the voltage output terminal when the control signal is set to the H logical voltage, and
an auxiliary switch configured to electrically disconnect an electrical path between the signal input terminal and the voltage input terminal when the reset signal is at the first voltage, and to electrically connect the electrical path between the signal input terminal and the voltage input terminal when the reset signal is at the second voltage.

6. The power supply device according to claim 5, wherein the plurality of sub-switching circuits are divided into a plurality of groups including two or more sub-switching circuits, and
the second control circuit outputs different control signals respectively to each of the plurality of groups.

7. The power supply device according to claim 2, wherein the switching circuit includes a voltage input terminal through the second power supply voltage is to be received, a signal input terminal through which the control signal is to be received, one or a plurality of first sub-switching circuits between the regulator circuit and the voltage output terminal, and one or a plurality of second sub-switching circuits between the regulator circuit and the voltage output terminal,
each of the one or the plurality of first sub-switching circuits includes
a main switch configured to electrically connect an electrical path between the voltage input terminal and the voltage output terminal when the control signal is set to the L logical voltage, and to electrically disconnect the electrical path between the voltage input terminal and the voltage output terminal when the control signal is set to the H logical voltage, and
an auxiliary switch configured to electrically disconnect an electrical path between the signal input terminal and the voltage input terminal when the reset signal is at the first voltage, and to electrically connect the electrical path between the signal input terminal and the voltage input terminal when the reset signal is at the second voltage, and
each of the one or the plurality of second sub-switching circuits includes the main switch.

8. The power supply device according to claim 1, further comprising:
a reset circuit configured to be driven by the first power supply voltage and to output a pre-reset signal for setting the reset signal to the first voltage or the second voltage.

9. The power supply device according to claim 8, wherein the first control circuit includes
a first buffer circuit configured to be driven by the second power supply voltage, receive the pre-reset signal, and to output the reset signal having the same logical voltage as a logical voltage of the pre-reset signal,
a second buffer circuit configured to be driven by the first power supply voltage, receive the pre-reset signal, and to output a forced reset signal having a logical voltage obtained by inverting a logical voltage of the pre-reset signal, and
a reset switch configured to electrically connect or disconnect an electrical path between the reset wiring and a power supply terminal that is at a voltage corresponding to the second voltage, according to the forced reset signal.

10. A power supply device comprising:
a regulator circuit configured to generate a second power supply voltage based on an input first power supply voltage;
a voltage output terminal from which the second power supply voltage is to be output;
a switching circuit that is provided between the regulator circuit and the voltage output terminal and is configured to transition between a first state in which the second power supply voltage is supplied to the voltage output terminal and a second state in which supply of the second power supply voltage to the voltage output terminal is cut off; and
a control circuit including a reset signal output terminal through which a reset signal that is set to a first voltage or a second voltage different from the first voltage is to be output,
the control circuit includes a reset switch configured to electrically connect or disconnect an electrical path between the reset signal output terminal and a power supply terminal that is at a voltage corresponding to the second voltage, according to a forced reset signal output from a circuit driven by the first power supply voltage, and
the switching circuit is configured to transition to the second state when the electrical path between the reset signal output terminal and the power supply terminal that is at the voltage corresponding to the second voltage is connected, and the reset signal is set to the second voltage.

11. The power supply device according to claim 10, wherein the switching circuit includes
a voltage input terminal through the second power supply voltage is to be received,
a signal input terminal through which a control signal is to be received,
a main switch configured to electrically connect an electrical path between the voltage input terminal and the voltage output terminal when the control signal is set to an L logical voltage, and to electrically disconnect the electrical path between the voltage input terminal and the voltage output terminal when the control signal is set to an H logical voltage, and
an auxiliary switch configured to electrically disconnect an electrical path between the signal input terminal and the voltage input terminal when the reset signal is at the first voltage, and to electrically connect the electrical path between the signal input terminal and the voltage input terminal when the reset signal is at the second voltage.

12. The power supply device according to claim 10, wherein
the switching circuit is provided between the regulator circuit and the voltage output terminal and includes a voltage input terminal through the second power supply voltage is to be received, a signal input terminal through which a control signal is to be received, and a plurality of sub-switching circuits, and
each of the plurality of sub-switching circuits includes
a main switch configured to electrically connect an electrical path between the voltage input terminal and the voltage output terminal when the control signal is set to an L logical voltage, and to electrically disconnect the electrical path between the voltage input terminal and the voltage output terminal when the control signal is set to an H logical voltage, and
an auxiliary switch configured to electrically disconnect an electrical path between the signal input terminal and the voltage input terminal when the reset signal is at the first voltage, and to electrically connect the electrical path between the signal input terminal and the voltage input terminal when the reset signal is at the second voltage.

13. The power supply device according to claim 10, wherein
the switching circuit includes a voltage input terminal through the second power supply voltage is to be received, a signal input terminal through which a control signal is to be received, one or a plurality of first sub-switching circuits between the regulator circuit and the voltage output terminal, and one or a plurality of second sub-switching circuits between the regulator circuit and the voltage output terminal,
each of the one or the plurality of first sub-switching circuits includes
a main switch configured to electrically connect an electrical path between the voltage input terminal and the voltage output terminal when the control signal is set to an L logical voltage, and to electrically disconnect the electrical path between the voltage input terminal and the voltage output terminal when the control signal is set to an H logical voltage, and
an auxiliary switch configured to electrically disconnect an electrical path between the signal input terminal and the voltage input terminal when the reset signal is at the first voltage, and to electrically connect the electrical path between the signal input terminal and the voltage input terminal when the reset signal is at the second voltage, and
each of the one or the plurality of second sub-switching circuits includes the main switch.

14. The power supply device according to claim 10, further comprising:
a reset circuit configured to be driven by the first power supply voltage and to output a pre-reset signal for setting the reset signal to the first voltage or the second voltage.

15. The power supply device according to claim 14, wherein the first control circuit includes
a first buffer circuit configured to be driven by the second power supply voltage, receive the pre-reset signal, and output the reset signal having the same logical voltage as a logical voltage of the pre-reset signal, and
a second buffer circuit configured to be driven by the first power supply voltage, receive the pre-reset signal, and output the forced reset signal having a logical voltage obtained by inverting a logical voltage of the pre-reset signal.

16. A semiconductor device comprising:
a target circuit; and
a power supply device that includes:
a regulator circuit configured to generate a second power supply voltage based on an input first power supply voltage,
a voltage output terminal from which the second power supply voltage is to be output to the target circuit,
a switching circuit that is provided between the regulator circuit and the voltage output terminal and is configured to transition between a first state in which the second power supply voltage is supplied to the voltage output terminal and a second state in which supply of the second power supply voltage to the voltage output terminal is cut off, a first control circuit configured to output a reset signal that is set to a first voltage or a second voltage different from the first voltage, a second control circuit configured to be driven by the second power supply voltage and to perform control so that the switching circuit transitions to the first state or the second state when the reset signal is at the first voltage, and a reset wiring electrically connecting the first control circuit and the switching circuit without passing through the second control circuit, wherein the switching circuit is configured to transition to the second state regardless of the control by the second control circuit when the reset signal received via the reset wiring is set to the second voltage.

17. The semiconductor device according to claim 16, wherein the target circuit is a logic circuit.

18. The semiconductor device according to claim 16, wherein the target circuit is a memory circuit.

19. The semiconductor device according to claim 16, wherein the first control circuit further includes a reset switch configured to electrically connect or disconnect an electrical path between the reset wiring and a power supply terminal that is at a voltage corresponding to the second voltage, according to a forced reset signal output from a circuit driven by the first power supply voltage.

20. The semiconductor device according to claim 16, wherein the power supply device further includes:

a reset circuit configured to be driven by the first power supply voltage and to output a pre-reset signal for setting the reset signal to the first voltage or the second voltage.

\* \* \* \* \*